Dec. 27, 1966   W. A. HIRSCH   3,295,004
WASHER SYSTEM EMPLOYING AN ARCUATELY CONFIGURED
FLUID DELIVERY TUBE
Filed May 6, 1964
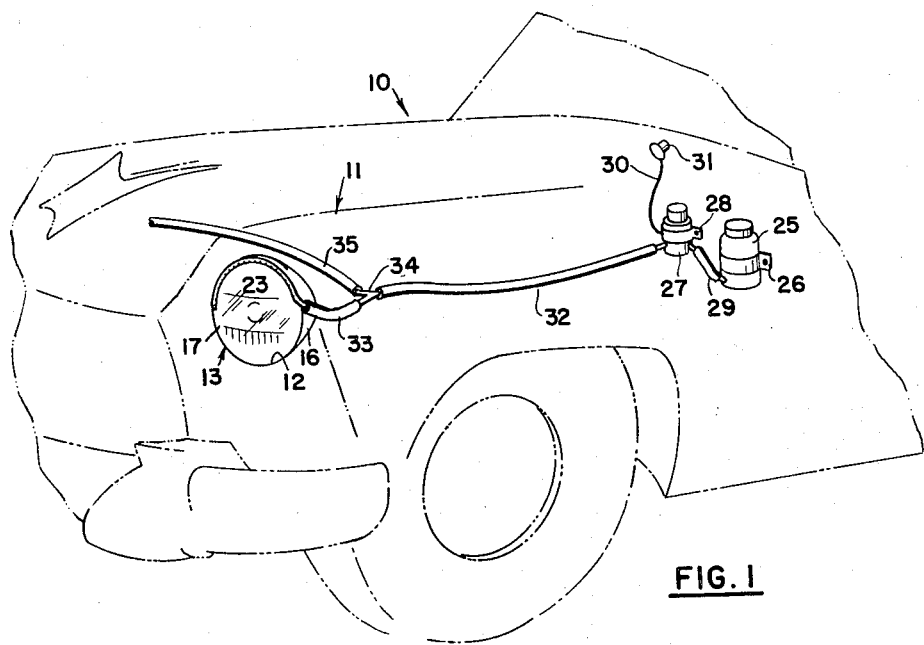
FIG. 1
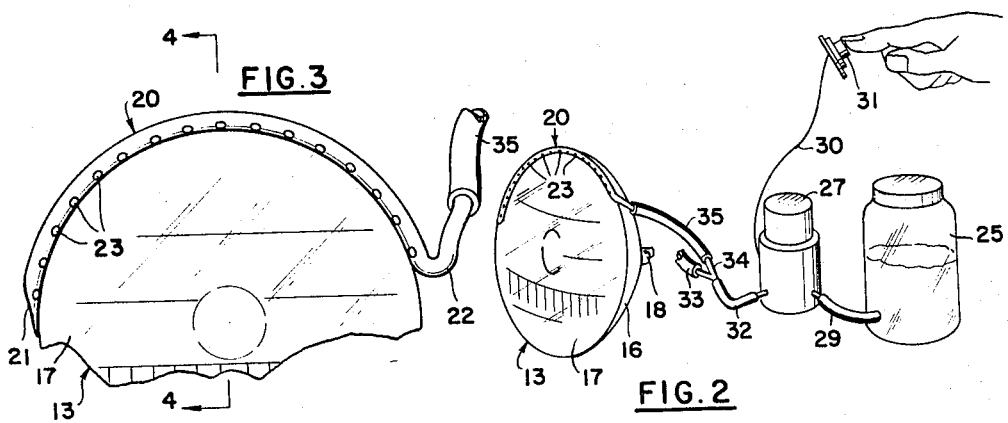
FIG. 3
FIG. 2
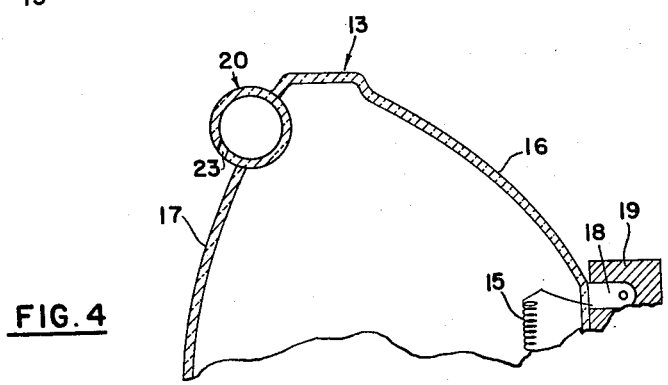
FIG. 4
INVENTOR.
WILLIAM A. HIRSCH
BY Robert K. Youtie
ATTORNEY

3,295,004
WASHER SYSTEM EMPLOYING AN ARCUATELY CONFIGURED FLUID DELIVERY TUBE
William A. Hirsch, 656 Cricket Ave., Ardsley, Pa. 19038
Filed May 6, 1964, Ser. No. 365,347
2 Claims. (Cl. 313—110)

This invention relates generally to motor vehicles, and is especially concerned with a unique and improved lamp construction for the headlights of vehicles.

As is well known, road dirt and grime quickly collect on the lenses of vehicle headlights to seriously reduce the illumination imparted by the headlights. This problem is most acute under wet driving conditions, and is believed to underlie the high accident rate occurring at night on wet roads.

While it has been proposed in the past to provide various devices for cleaning vehicle headlights, such devices have been relatively complex, expensive, and unreliable, so as to have found little public acceptance.

Accordingly, it is an important object of the present invention to provide a vehicle-headlight construction incorporating a unique headlight washer system which is extremely simple in construction, durable and entirely reliable throughout a long useful life, and which can be economically manufactured for sale at a reasonable price.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

In the drawings:

FIGURE 1 is a partial, front perspective view showing an automotive vehicle in phantom, and illustrating in association therewith the headlight washer system of the present invention:

FIGURE 2 is a schematic representation of the instant headlight washer system apart from the vehicle;

FIGURE 3 is a partial front elevational view showing a headlight constructed in accordance with the teachings of the present invention; and FIGURE 4 is a sectional elevational view taken generally along the line 4—4 of FIGURE 3.

Referring now more particularly to the drawings, and specifically to FIGURE 1 thereof, an automative vehicle is there generally designated 10, and may include a headlight housing 11, which in accordance with the present fashion may also serve as a wheel fender.

The headlight housing-fender 11 may be substantially conventional, having a forwardly facing opening 12 for the presentation therethrough of a lamp 13.

The lamp 13 is best seen in FIGURES 3 and 4 and may include a conventional illuminating filament 15 mounted in and completely enclosed by a hermetically sealed envelope 16, say of glass. The envelope 16 may have a generally circular-shaped forward end wall 17 defining a lens for transmitting light from the filament 15. Projecting rearwardly from the envelope 16 may be conventional electrical-connection elements 18 for interengagement with an electrical receptacle 19 mounted in hosuing 11.

As thus far described, the lamp 13 may be substantially conventional. However, extending across an upper region or margin of the envelope front wall or lens 17 there is provided a spray head or tube 20, constructed in accordance with the teachings of the instant invention.

The tube 20 may be fabricated of glass and advantageously formed integrally with the envelope 16, say in manufacture thereof. If preferred, rather than being molded simultaneously with the envelope 16, the tube 20 may be welded, fused or otherwise secured to the envelope subsequent to formation of the latter.

The tube 20 may be of a generally arcuate configuration extending marginally about an upper region of the lens 17 and having one end closed, as at 21. The other end of the tube 20 may be formed with a tubular, rearward extension 22 communicating with the interior of the tube, for a purpose appearing presently. At spaced locations along the tube 20 there are formed therein a plurality of thru holes or discharge outlets 23 which are open generally downwardly toward the lends 17.

In addition to the above-described novel headlamp construction, the instant system includes a container 25, for containing a supply of cleaning liquid, such as water, detergent or the like, which container may be mounted on the vehicle fire wall, as by a strap 26. A pump 27 may also be suitably mounted, as by a strap 28, and has its inlet connected to the container 25 by suitable fluid-conduit means, such as a hose 29. The pump 27 may be electrically energized as by conductors 30 connected to a switch 31 conveniently located, say on the dash panel of vehicle 10. The outlet of pump 27 is connected by a fluid conduit or hose 32, and an additional fluid conduit or hose 33 to the open end or inlet nipple 22 of the tube 20. The Y connection 34 between conduits 32 and 33 may be connected to an additional conduit 35 for use with the other headlight (not shown).

In operation, it is only necessary to energize pump 27 by operation of switch 31 to pump liquid from container 25, through conduits 29, 32 and 33 to tube 20. The liquid thus pumped is discharged through openings 23 onto the lens 17 to cleanse the latter.

From the foregoing, it is seen that the present invention provides a unique headlight construction for a vehicle, and headlight washer system, which fully accomplish the intended objects and are well adapted to meet practical conditions of manufacture, installation, maintenance and use.

Although the present invention has been described in some detail by way of illustration and example for purposes of clarity of understanding, it is understood that certain changes and modifications may be made within the spirit of the invention and scope of the appended claims.

What is claimed is:

1. A vehicle-headlight construction comprising a housing having an opening, an electrical receptacle in said housing and facing toward said opening, a sealed-beam lamp having a connection part at one end and a generally circular glass lens at the other end, said lamp being mounted in said housing with its connection part connected to said receptacle and its lens facing outwardly from said opening, a hollow elongate tubular spray head fixedly secured to the exterior of said lens extending arcuately across an upper margin thereof, said spray head having a plurality of spaced thru holes opening downwardly toward said lens, and liquid-supply means connected to said spray head to deliver liquid to the spray head for discharge onto the lens, said spray head comprising a glass tube extending laterally across an upper region of said lens and formed integrally therewith, said holes being on the underside of said tube, one end of said tube being closed and the other end being open for connection to said liquid-supply means.

2. A vehicle sealed-beam headlamp comprising a filament, an enveloping enclosing said filament, one end of said envelope being configured to define a generally circular lens, electrical-connection means on the other end of said envelope for connection to a vehicle with said lens disposed generally vertically, and a hollow elongate tubular spray head fixedly secured on the exterior of said lens extending arcuately across an upper margin thereof, said spray head having a plurality of spaced thru holes opening downwardly toward said lens, said spray head comprising a glass tube extending laterally across an upper region of said lens and formed integrally therewith, said holes being on the underside of said tube, one end of said tube being closed and the other end being open for connection to a liquid-supply source.

References Cited by the Examiner
UNITED STATES PATENTS

| | | | |
|---|---|---|---|
| 1,402,416 | 1/1922 | Hagberg et al. | 239—284 |
| 1,441,238 | 1/1923 | Morris | 239—284 |
| 2,116,529 | 5/1938 | McNeil | 4—69 |
| 3,117,727 | 1/1964 | Pollock et al. | 240—7.1 |

JAMES W. LAWRENCE, *Primary Examiner.*

S. A. SCHNEEBERGER, *Assistant Examiner.*